United States Patent [19]

Harada et al.

[11] Patent Number: 4,908,272

[45] Date of Patent: Mar. 13, 1990

[54] GAS-BARRIER MULTILAYERED STRUCTURE

[75] Inventors: Masahiro Harada, Hiratsuka; Makoto Matsumura, Toyonaka; Toru Kino; Akira Iwamoto, both of Hiratsuka; Yoshiaki Momose, Hadano, all of Japan

[73] Assignee: Mitsubishi Gas Chemical Company, Inc., Tokyo, Japan

[21] Appl. No.: 186,080

[22] Filed: Apr. 25, 1988

[30] Foreign Application Priority Data

Apr. 27, 1987 [JP] Japan .................................. 62-102019
Apr. 27, 1987 [JP] Japan .................................. 62-102020

[51] Int. Cl.$^4$ ...................... B32B 27/34; B32B 27/08; B32B 27/28
[52] U.S. Cl. ................................ 428/412; 428/476.9; 428/475.2; 428/474.9; 428/474.7; 428/476.1; 528/339
[58] Field of Search ............... 428/474.4, 476.9, 475.2, 428/474.9, 412; 528/339

[56] References Cited

U.S. PATENT DOCUMENTS 3,843,479  10/1974  Matsunami et al. ............. 428/474.7

Primary Examiner—George F. Lesmes
Assistant Examiner—Elizabeth M. Cole
Attorney, Agent, or Firm—Wenderoth, Lind & Ponack

[57] ABSTRACT

A gas-barrier multilayered structure comprising (A) at least one layer of a copolyamide composed of (a) a dicarboxylic acid component composed of 55 to 70 mole % of an aliphatic dicarboxylic acid component and 45 to 30 mole % of an aromatic dicarboxylic acid component consisting substantially of 20 to 30 mole % of isophthalic acid and 5 to 20 mole % of terephthalic acid, and (b) a diamine component composed substantially of a m-xylylenediamine component, and (B) at least one layer of a thermoplastic resin other than the copolyamide. Instead of the layer (A), there can be used (A') at least one layer of a mixture of 40 to 60 % by weight of a first copolyamide composed of (a) a dicarboxylic acid component composed of 55 to 70 mole % of an aliphatic dicarboxylic acid component and 45 to 30 mole % of an aromatic dicarboxylic acid component consisting substantially of 20 to 30 mole % of isophthalic acid and 5 to 20 mole % of terephthalic acid and (b) a diamine component composed substantially of m-xylylenediamine and 60 to 40 % by weight of a second polyamide composed of a dicarboxylic acid component consisting substantially of an aliphthalic dicarboxylic acid component and a diamine component consisting substantially of a m-xylylenediamine component.

14 Claims, No Drawings

GAS-BARRIER MULTILAYERED STRUCTURE

This invention relates to a gas-barrier multilayered structure. More specifically, it relates to a gas-barrier multilayered structure, such as a film, sheet or container, which has excellent transparency and heat resistance and does not undergo deformation even when it is subjected to a hot water treatment for sterilization or when a food or drink is filled into it at high temperatures.

Multilayered sheets, films and containers formed of gas-barrier resins and thermoplastic resins such as polyesters, polyamides and polyolefins have recently come into widespread use for packaging foods and drinks which require a high level of gas-barrier property.

Known resins used as gas-barrier layers include, for example, ethylene/vinyl alcohol copolymer, vinylidene chloride copolymers, acrylonitrile copolymers and polyamides such as poly-m-xylylene adipamide (to be abbreviated nylon MXD6 hereinafter). Nylon MXD6, in particular, has recently been positively utilized as a gas-barrier resin of such multilayered structures because it has excellent gas barrier property and better thermal stability than other resins at the time of melting and therefore can be co-extruded or co-injection-molded with other thermoplastic resins such as polyethylene terephthalate (abbreviated PET hereinafter), nylon 6, polycarbonate and polypropylene.

The glass transition temperature of a polyamide obtained by polycondensation reaction of an aliphatic dicarboxylic acid and m-xylylenediamine, typified by nylon MXD6, is about 70° C. Accordingly, when, for example, a transparent broad-mouthed container or a transparent bottle formed of a layer of nylon MXD6 and a layer of PET obtained by stretch blowing is immersed in hot water at 80° C. or higher, it shrinks greatly. Containers comprising nylon MXD6 thus cannot be used for holding foods and drinks which require hot water treatment or high-temperature filling for sterilization.

Japanese Patent Publication No. 23792/1981 proposes a gas-barrier multilayered container composed of a layer of a polyolefin such as polyethylene and polypropylene and a layer of nylon MXD6. In processing by deep drawing or stretch blowing, the right temperature for polyolefins is higher than that for PET. Nylon MXD6 is therefore liable to crystallize at such higher temperatures so that the stretching and thermoforming of the multilayered structure are difficult. Consequently, thickness non-uniformity and whitening tend to occur, and a container satisfactory in shape and transparency is difficult to obtain.

Japanese Laid-Open Patent Publication No. 232,952/1985 proposes a gas-barrier multilayered structure composed of a polyamide obtained by polycondensation of m-xylylenediamine and a dicarboxylic acid component containing a specific proportion of isophthalic acid and a thermoplastic polyester typified by PET. The copolyamide disclosed in this patent document which contains isophthalic acid as part of the dicarboxylic acid units has a higher glass transition temperature than nylon MXD6 and is of low crystallinity or substantially amorphous. If the proportion of isophthalic acid used is increased so as to impart amorphousness, the copolyamide disclosed in this document attains a high melt viscosity and is liable to become rubbery and therefore is difficult to obtain as a high-molecular-weight polymer by a melt process.

It is an object of this invention to provide a novel gas-barrier multilayered structure.

It is another object of this invention to provide a novel multilayered structure comprising a gas-barrier layer of a copolyamide derived from m-xylylenediamine as a diamine component and a specific dicarboxylic acid mixture of a specific composition as a dicarboxylic acid component.

Still another object of this invention is to provide a gas-barrier multilayered structure having excellent heat resistance and transparency which does not undergo deformation such as shrinkage or expansion and whitening during a hot water treatment or filling of a food or drink at high temperatures for sterilization.

Further objects of this invention along with its advantages will become apparent from the following description.

According to this invention, the objects and advantages of this invention are firstly achieved by a gas-barrier multilayered structure comprising:

(A) at least one layer of a copolyamide composed of:
  (a) a dicarboxylic acid component composed of 55 to 70 mole % of an aliphatic dicarboxylic acid component and 45 to 30 mole % of an aromatic dicarboxylic acid component consisting substantially of 20 to 30 mole % of isophthalic acid and 5 to 20 mole % of terephthalic acid, and
  (b) a diamine component composed substantially of a m-xylylenediamine component, and
(B) at least one layer of a thermoplastic resin other than the copolyamide.

The gas-barrier multilayered structure of this invention comprises the layer (A) of the copolyamide of a specific composition and the layer (B) of the other thermoplastic resin.

The copolyamide is composed of a dicarboxylic acid component composed of 55 to 70 mole % of an aliphatic dicarboxylic acid component and 45 to 30 mole % of an aromatic dicarboxylic acid component and a diamine component consisting substantially of a m-xylylenediamine component. According to this invention, the aromatic dicarboxylic acid component is composed substantially of isophthalic acid and terephthalic acid. Of 45 to 30 mole % of the aromatic dicarboxylic acid component, isophthalic acid accounts for 20 to 30 mole %, and terephthalic acid, 5 to 20 mole %.

If the proportion of the aliphatic dicarboxylic acid component in the dicarboxylic acid component exceeds 70 mole %, the resulting copolyamide has a lowered glass transition temperature and therefore a multialyered structure which will withstand hot water treatment or high-temperature filling cannot be obtained.

If the proportion of the aliphatic dicarboxylic acid is less than 55 mole %, the resulting copolyamide has an increased melt viscosity and its thermal stability during melting is lowered. Hence, completion of the polycondensation and melt-molding becomes difficult and a suitable material for the present invention cannot be obtained.

If the proportion of isophthalic acid is less than 20 mole % or the proportion of terephthalic acid is less than 5 mole % in the entire dicarboxylic acid component, the resulting copolyamide shows the properties of a crystalline polymer. Consequently, the copolyamide tends to be whitened by heating during thermoforming, or by the hot-water treatment of the product obtained by thermoforming. The resulting material is not suitable for the multilayered structure of the invention characterized by excellent heat resistance and transparency.

Preferably, the copolyamide used in this invention contains a dicarboxylic acid component composed of 60 to 70 mole % of the aliphatic dicarboxylic acid component and 40 to 30 mole % of the aromatic dicarboxylic acid component. Of 40 to 30 mole % of the aromatic dicarboxylic acid component, isophthalic acid accounts for 25 to 30 mole %, and terephthalic acid, 5 to 15 mole %.

Examples of the dicarboxylic acid of the aliphatic dicarboxylic acid component are succinic acid, glutaric acid, adipic acid, pimelic acid, suberic acid, azelaic acid, sebacic acid and dodecanedioic acid. Adipic acid is especially preferred. A copolyamide containing adipic acid as the aliphatic dicarboxylc acid component shows particularly good gas-barrier property.

The diamine component of the copolyamide used in this invention is composed substantially of m-xylylenediamine, but may contain a minor proportion, for example, not more than 40 mole % based on the entire diamine component, of another diamine. Examples of the other diamine are aliphatic diamines such as tetramethylenediamine, pentamethylenediamine, hexamethylenediamine and octamethylenediamine, aliphatic diamines having a cyclic structure such as 1,3-bis-(aminomethyl)cyclohexane and 1,4-bis(aminomethyl)-cyclohexane, and aromatic diamines such as p-xylylenediamine and m-phenylenediamine.

The copolyamide used in this invention can be produced by a known method, for example by going through a nylon salt obtained from the corresponding dicarboxylic acid and diamine, or by directly reacting the corresponding dicarboxylic acid and diamine.

For example, a specific procedure of the direct reaction comprises adding m-xylylenediamine dropwise under atmospheric pressure to the molten dicarboxylic acid having a powdery aromatic dicarboxylic acid dispersed in it, while the temperature is elevated to 160° to 300° C., and thus allowing them to react with each other. Unlike the method going through the nylon salt, this direct reaction has the advantage that the nylon salt having a high melting point obtained from terephthalic acid and m-xylylenediamine is not left in the reaction system, and a copolyamide can be easily obtained.

The copolyamide used in this invention has a glass transition temperature, determined by the DSC method, of 90° to 130° C. while a polyamide obtained from the corresponding aliphatic dicarboxylic acid and m-xylylenediamine has a glass transition temperature, measured by the same method, of about 75° C. Furthermore, no clear endothermic peak corresponding to the melting point is observed in the DSC analysis of the copolyamide used in this invention even after it has been melt-molded by, for example, extrusion or injection molding, or thermoformed by stretch blow molding or deep drawing, or stretching, except for special cases such as the case of stretching at temperatures below the glass transition temperature. For the above reasons, the copolyamide used in this invention is regarded as a substantially amorphous polymer.

In other words, the copolyamide used in this invention does not crystallize nor is it whitened or reduced in processabilty by the residual heat during thermoforming such as ordinary blow molding and deep drawing. Furthermore, even when the other thermoplastic resin layer is crystallized by the residual heat during processing or by intentional heating, the copolyamide does not form many excessively large spherulites which may cause whitening, nor does it reduce the transparency of the multilayered structure of the invention.

The thermoplastic resin constituting the layer (B) of the multilayered structure of the invention is a thermoplastic resin other than the copolyamide described above. Preferably, it may be, for example, a polyolefin, polystyrene, polyester, polycarbonate or polyamide.

Examples of the polyolefin are polyethylene, polypropylene, copolymers of at least two alpha-olefins such as ethylene, propylene or butene, and mixtures of the foregoing polymers or copolymers.

The polyester is preferably a polyester composed substantially of a diol component and a dicarboxylic acid component.

Diol components composed mainly of ethylene glycol and cyclohexanedimethanol are preferably used as the diol component. Preferred as the dicarboxylic acid component are dicarboxylic acid components composed mainly of terephthalic acid, isophthalic acid and naphthalenedicarboxylic acid. Polyesters that can be used in this invention may contain a minor proportion of another diol component such as neopentyl glycol, propylene glycol, butanediol, diethylene glycol and bis(hydroxyethoxy)benzene and an aliphatic dicarboxylic acid component such as adipic acid, sebacic acid and hexahydroterephthalic acid, in addition to the main components described above. Polyesters comprising units of a hydroxycarboxylic acid component such as p-hydroxybenzoic acid can also be used.

Examples of preferred polyesters include PET, polycyclohexanedimethylene terephthalate, polycyclohexanedimethylene isophthalate, polyethylene naphthalenedicarboxylate, and copolyesters composed mainly of the units of the foregoing polyesters.

These polyesters may be used singly or in combination.

The polycarbonate is preferably a polycarbonate ester composed mainly of units of a carbonate of bisphenol A.

Examples of preferred polyamides are aliphatic polyamides such as nylon 6, nylon 66, nylon 11, nylon 12, nylon 46 and nylon 610 and copolyamides composed mainly of the componet units of the foregoing polyamides.

These other thermoplastic resins may be used as mixtures unless the resulting mixtures completely lack transparency.

The mutilayered structure of this invention may, for example, be in the form of a sheet, a film, a tube a container such as a bottle, cup or can, or a bag.

The multilayer structure of this invention comprises at least one layer (A) of the copolyamide and at least one layer (B) of the other thermoplastic resin.

The multilayered structure of the invention may be, for example, a two-layer structure composed of one layer of the copolyamide and one layer of the other thermoplastic resins; a three-layer structure composed of two layers of the copolyamide and one layer of the other thermoplastic resin interposed between them; a three-layer structure composed of two layers of the other thermoplastic resin and one layer of the copolyamide interposed between them; or a five-layer structure composed of two layers of the copolyamide and three layers of the other thermoplastic resin positioned alternately. When there are two or more copolyamide layers, the copoyamides constituting these layers may be the same or different. Likewise, the thermoplastic resins of two or more layers may be the same or different.

In the case of containers for holding water-containing foods or drinks which require hot filling, it is preferred to use a multilayered structure having the other thermoplastic resin as an inside layer so that the gas-barrier properties and mechanical properties of the containers may not be reduced by water absorption of the copolyamide layer.

In the multilayered structure of this invention, an adhesive resin layer may be formed between the copolyamide layer and the other thermoplastic resin layer or between layers of two different thermoplastic resins. This embodiment is also within the scope of the invention.

The adhesive resin used in the adhesive resin layer (adhesive layer) may be selected from known adhesive resins. For example, modified polyethylene, modified polypropylene or modified copolymers of olefins such as ethylene, propylene and butene can be used as adhesive resins for the copolyamide and polyolefins. For adhesion of the copolyamide to a polyester or polycarbonate, ethylene/vinyl acetate copolymer, ethylene/acrylic acid copolymer, an alkali or alkaline earth metal crosslinked product of ethylene/acrylic acid copolymer, and ethylene/acrylate copolymers, for example, may be preferably used.

These adhesive resins may be used as such, or as mixtures with the resins of layers to be bonded. For example, they may be used as a composition prepared by melt-mixing with a thermoplastic resin such as a polyester, polyamide, polycarbonate or polyolefin. This can further increase the adhesion strength between layers to be bonded.

Specific examples of the multilayered structure of the invention are shown below.

(1) A five-layer structure composed of a central layer of a polyamide comprising adipic acid as the aliphatic dicarboxylic acid component, two outermost layers of polyethylene or polypropylene, and adhesive layers of modified polypropylene or modified polyethylene interposed between the central layer and one outermost layer and between the central layer and the other outermost layer.

(2) A five-layer structure composed of two outermost layers of polyethylene terephthalate, a central layer of polyethylene terephthalate, and layers of the copolyamide between the central layer and one outermost layer and between the central layer and the other outermost layer.

(3) A four layer structure composed of one outside layer of a polyolefin resin, another outside layer of nylon 6/nylon 66 copolymer, a central layer of the copolyamide, and an adhesive layer between the central layer and the outside layer of the polyolefin resin.

The multilayered structure of this invention can be produced by various known methods, for example coextrusion, dry lamination and tandem lamination based on an inflation or T-die method, injection molding methods such as sandwich molding of successively injecting two or more molten resins into a mold, two color molding or insert molding, or a method comprising placing a molded article such as a film or sheet molded in advance in a mold and injecting a thermoplastic resin into the mold to form a multilayered structure.

The sheet, film or container produced by coextrusion or coinjection-molding may be used as such. Or the sheet or film may be processed into a container or a bag by some heating, heat sealing or other bonding methods. For example, the sheet, film or parison may be formed into containers such as bottles and cups by processing them further with stretching, for example by stretch blow molding or deep drawing.

The sheet and film may be stretched and then formed into a bag by heat-sealing or other bonding methods.

Investigations of the present inventors have shown that the above objects of this invention are achieved equally by using a mixture of 40 to 60% by weight of the copolyamide and 60 to 40% by weight of a second polyamide composed of an aliphatic dicarboxylic acid component and a m-xylylenediamine component instead of the copolyamide described above.

The second polyamide is a crystalline polymer known as a gas-barrier packaging material. For example, attempts have already been made to utilize poly(m-xylylene adipamide) as a gas-barrier packaging material. Although the second polyamide is crystalline, a mixture of it with the copolyamide in specific proportions can equally achieve the objects of this invention even if it is used in place of the copolyamide.

According to this invention, therefore, there is equally provided a gas-barrier multilayered structure comprising (A') at least one layer of a mixture of 40 to 60% by weight of a first copolyamide composed of (a) a dicarboxylic acid component composed of 55 to 70 mole % of an aliphatic dicarboxylic acid component and 45 to 30 mole % of an aromatic dicarboxylic acid component consisting substantially of 20 to 30 mole % of isophthalic acid and 5 to 20 mole % of terephthalic acid and (b) a diamine component composed substantially of m-xylylenediamine and 60 to 40% by weight of a second polyamide composed of a dicarboxylic acid component consisting substantially of an aliphatic dicarboxylic acid component and a diamine component consisting substantially of a m-xylylenediamine component, and (B') at least one layer of a thermoplastic resin other than the first copolyamide and second polyamide.

The first copolyamide in (A') is the same as the copolyamide described hereinabove. The second polyamide is composed of a dicarboxylic acid component consisting substantially of an aliphatic dicarboxylic acid component and a diamine component consisting substantially of m-xylylenediamine. Preferred examples of the dicarboxylic acid in the aliphatic dicarboxylic acid component include adipic acid, pimelic acid, suberic acid, azelaic acid and sebacic acid. The diamine of the diamine component may preferably be the same as those described above with regard to the first copolyamide. The second polyamide may also be produced by the same methods as described above for the first copolyamide.

The mixture in (A') consists of 40 to 60% by weight, preferably 45 to 60% by weight, of the first copolyamide and 60 to 40% by weight, preferably 55 to 40% by wight, of the second polyamide.

If the proportion of the first copolyamide is less than 40% by weight, the effect of the heat resistance of the first copolyamide having a high glass transition temperature does not appear clearly. If the proportion of the first copolyamide exceeds 60% by weight, the thermoforming temperature should be elevated. Hence, when the other thermoplastic resin constituting the multilayered structure together with the polyamide mixture is crystalline, whitening may occur owing to crystallization or the processability of the multilayered structure may be reduced. Consequently, thermal decomposition may occur at the time of heating.

The advantage of using the mixture of the first copolyamide and the second polyamide in (A') will become clear if it is compared with the case of using a single copolyamide obtained from the acid components and diamine components constituting the first copolyamide and the second polyamide in the same proportions as above. Specifically, the single copolyamide crystallizes at a low rate but still has crystallinity and forms excessively large spherulites and is whitened by heating or hot water treatment. The polyamide mixture used in this invention does not undergo whitening by a heat-treatment such as pressurized hot water treatment. Accordingly, the multilayered structure of the invention comprising this polyamide mixture can retain good transparency.

The first copolyamide and the second polyamide may be mixed by various devices capable of dry-blending or melt-kneading polyamides, such as a V-type blender or an extruder equipped with a heater or a kneader.

In view of handlability during molding, it is preferred to dry-blend in a V-type blender to form the dry-blended mixture or to melt-extrude these polyamides in an extruder to form granulates of the polyamide mixture, and then use the mixture in coextrusion or coinjection molding.

It should be understood that with regard to other features of the multilayered structure of the invention comprising the polyamide mixture, the foregoing description of the multilayered structure of the invention comprising the copolyamide (first copolyamide) is equally applicable if the polyamide mixture is read for the copolyamide.

The following examples illustrate the present invention in greater detail.

The various properties in the following examples were measured by the following methods.

(1) Haze

Measured by JIS K-6714 or ASTM D883-62T using a digital hazemeter (ND-504AA made by Nippon Denshoku Kogyo K. K.)

(2) Shrinkage

Indicator lines were drawn longitudinally and laterally in a film or container sample, and the lengths of the indicator lines before and after the treatment were measured. The shrinkage (%) was calculated in accordance with the following equation.

$$\text{Shrinkage (\%)} = \left(1 - \frac{a \times b}{a_o \times b_o}\right) \times 100$$

wherein
  $a_o$ and $b_o$: the lengths of the indicator lines in the longitudinal and lateral directions before the treatment.
  $a$ and $b$: the lengths of the indicator lines in the longitudinal and lateral directions after the treatment (3) Oxygen permeability Measured substantially in accordance with ASTM D3985 using OXTRAN 100A made by Modern Control Co., Ltd.

(4) Glass transition temperature (Tg)

The glass transition temperature was measured by the DSC method using SSC/560S made by Seiko Electronics Co., Ltd. at a temperature elevating rate of 20° C./min.

(5) Relative viscosity ($\eta_{rel.}$)

Measured at 25° C. for a solution of 1 g of the sample resin in 100 ml of 96% sulfuric acid.

REFERENTIAL EXAMPLE

Adipic acid (3100 g), 1640 g of isophthalic acid and 910 g of terephthalic acid were charged into 20-liter reactor equipped with a stirrer, a jacket and a partial condenser and a condenser, and heated by a heat medium circulating device to melt adipic acid. Then, 4990 g of m-xylylenediamine (to be referred to as MXDA hereinafter) was added dropwise to molten adipic acid in which powdery isophthalic acid and terephthalic acid were dispersed to perform reaction. During the addition of MXDA, the reaction temperature was raised from 170° to 240° C. over 50 minutes. After the addition of MXDA, the temperature was further raised to 260° C. The mixture was reacted further at 260° C. for 1.5 hours to complete polycondensation in the molten state.

The resulting copolyamide had a relative viscosity of 2.35 with no solid unreacted isophthalic acid and terephthalic acid observed therein.

EXAMPLE 1

Copolyamide (Tg=123° C.) was obtained from adipic acid, isophthalic acid, terephthalic acid and MXDA (mole ratio 58/27/15/100) as starting materials by the same method as in Referential Example. The resulting copolyamide and polypropylene (FY-6C made by Mitsubishi Petrochemical Industries, Ltd.) were used as resin layers and modified polypropylene (Qf-305 made by Mitsui Petrochemical Industries, Ltd.) was used as an adhesive layer for the two resin layers, and a five-layer sheet composed of two outside layers of polypropylene, an interlayer of the copolyamide and adhesive layers of modified polypropylene between the interlayer and one outside layer and between the interlayer and the other outside layer was produced by a T-die method using three extruders and feed block, respectively.

The resulting sheet was then formed into a container having a depth of 26 mm, a diameter at the opening portion of 54 mm and a diameter at the bottom portion of 53 mm by using a vacuum thermoforming machine.

Water was put in the resulting container, and an aluminum foil having a heat seal layer was put over the container and welded thereto by a heat sealing machine to seal up the container.

The container holding water was treated with pressurized hot water at 120° C. for 30 minutes in an autoclave for retorting (made by Tomy Seiko Co., Ltd.).

As shown in Table 1, the container obtained in this example retained good transparency and the original form even after the pressurized hot water treatment.

The resulting five-layer sheet was stretched simultaneously in two directions at an area stretch ratio of 4 using a tenter-type stretching machine (made by Toyo Seiki Seisakusho).

The biaxially stretched film was subjected to hot water treatment under pressure at 120° C. for 30 minutes. The stretchability and the haze of the product after heating and pressurized hot water treatment were measured, and the results are shown in Tables 2 and 3.

COMPARATIVE EXAMPLE 1

Nylon MXD6 (Tg=75° C.) and polypropylene (FY-6C produced by Mitsubishi Petrochemical Industries, Ltd.) were used as resin layers and modified polypropylene (QF-305 made by Mitsui Perochemical Industries, Ltd.) was used as adhesive layers for the two resin layers. By the same method as in Example 1, a five-layer sheet composed of two outside layers of polypropylene, a central layer of nylon MXD6 and layers of the modified polypropylene between the central layer and one outside layer and between the central layer and the other outside layer, respectively, was produced.

The sheet was vacuum-formed as in Example 1 to form a container. The container was subjected to a pressurized hot water treatment. The transparency and shrinkage of the container after the pressurized hot water treatment were measured, and the results are shown in Table 1.

As in Example 1, the five-layer sheet was stretched simultaneously in two directions at an area stretch ratio of 4 at a temperature of 150°, 140°, and 110° C. respectively using a tenter-type stretching machine (made by Toyo Seiki Seisakusho).

The haze of the container after stretching and the stretchability of the sheet were measured, and the results are shown in Table 2.

COMPARATIVE EXAMPLE 2

Copolyamide (Tg=89° C.) was obtained from adipic acid, isophthalic acid, terephthalic acid and MXDA (mole ratio 83/11/6/100) as starting materials by the same method as in Referential Example.

Using the copolyamide and polypropylene (FY-6C produced by Mitsui Petrochemical Industries, Ltd.) as resin layers and modified polypropylene (QF-305 produced by Mitsui Petrochemical Industries, Ltd.) as adhesive layers for the two resin layers, a five-layer sheet composed of two outside layers of polypropylene, a central layer of the copolyamide and adhesive layers of modified polyproylene between the central layer and one outside layer and between the central layer and the other outside layer respectively was produced by the same apparatus as in Example 1.

As in Example 1, the sheet was then stretched simultaneously in two directions at an area stretch ratio of 4 using a tenter-type stretching machine (Toyo Seiki Seisakusho). The biaxially stretched film was heat-set at 150° C. for 30 seconds, and then treated with hot water at 120° C. under pressure for 30 minutes.

The stretchability and the haze after heating and presurized hot water treatment were measured, and the results are shown in Tables 2 and 3.

TABLE 1

| Item | Example 1 | Comparative Example 1 | Comparative Example 2 |
|---|---|---|---|
| Haze of the body portion of the cup | | | |
| Before hot water treatment (%) | 8.3 | 19 | 8.5 |
| After hot water treatment (%) | 8.7 | 22 | 21 |
| Shrinkage (%) | 1.7 | 2.0 | 10 |

TABLE 2

| Conditions and results | Example 1 | Comparative Example 1 | | | 2 |
|---|---|---|---|---|---|
| Sheet thickness (microns) | | | | | |
| 1st layer | 90 | 90 | 90 | 90 | 90 |
| 2nd layer | 34 | 32 | 32 | 32 | 32 |
| 3rd layer | 36 | 36 | 36 | 36 | 37 |
| 4th layer | 34 | 33 | 33 | 33 | 32 |
| 5th layer | 100 | 97 | 97 | 97 | 97 |
| Stretch ratio | 4.0 | 4.0 | 4.0 | 4.0 | 4.0 |
| Stretching temperature (°C.) | 150 | 150 | 140 | 110 | 150 |
| Stretchability | good | nylon layer crystallized stretching impossible | great thickness nonuniformity, stretching difficult | stretching temperature low, stretching impossible | good |
| Haze of the stretched film (%) | 5.1 | — | above 20 | — | 5.4 |

TABLE 3

| Properties of the stretched film after pressurized hot water treatment (%) | Example 1 | Comparative Example 2 |
|---|---|---|
| Haze (%) | 5.2 | 22 |
| Shrinkage (%) | 0.5 | 10 |

EXAMPLE 2

Copolyamide (Tg=107° C.) obtained by the same method as in Referential Example from adipic acid, isophthalic acid, terephthalic acid and MXDA (mole ratio 67/27/6/100) as starting materials and PET (RT-543 produced by Japan Unipet Co., Ltd.) were succesively injected into the same mold from different injection molding machines to form a five-layer parison composed of an inside and an outside layer of PET, an interlayer of PET and layers of the copolyamide between the interlayer and the outside layer and between the interlayer and the other outside layer, respectively.

The parison was blow-molded under a blow pressure of 20 kg/cm² at a blow temperature of about 110° C. to form a 5-layer bottle having an inner capacity of 1.5 liters. The properties of the five-layer bottle are shown in Table 4.

COMPARATIVE EXAMPLE 3

A five-layer parison composed of an inside and an outside layer of PET, an interlayer of PET and two layers of nylon MXD6 between the interlayer and the inside layer and between the interlayer and the outside layer, respectively, was formed in the same way as in Example 2 except that nylon MXD6 was used instead of the copolyamide.

The resulting parison was blow-molded under a blow pressure of 20 kg/cm$^2$ at a blow temperature of 85° to 95° C. to form a five-layer bottle having an inner capacity of 1.5 liters.

The thicknesses of the individual layers of the five-layer bottle and the properties of the bottle are shown in Table 4.

When an attempt was made in this comparative example to perform blow molding at the same blow-molding temperature as in Example 2, the parison was deformed by its own weight, and whitening and crystallization of the nylon MXD6 layer occurred. It was difficult to perform blow-molding successfully. Even when the blow molding was possible, the resulting bottle had a non-uniform thickness or was whitened.

TABLE 4

| Item | Example 2 | Comparative Example 3 |
|---|---|---|
| Thickness of the body portion (microns) | | |
| 1st layer | 90 | 90 |
| 2nd layer | 14 | 15 |
| 3rd layer | 99 | 97 |
| 4th layer | 11 | 11 |
| 5th layer | 146 | 147 |
| Haze of the body portion (%) | 1.7 | 1.7 |
| Oxygen permeability (cc/day-atm) of the container (*) | 0.12 | 0.12 |
| Shrinkage after filling hot water (85° C.) (%) | 2.5 | 12 |

(*) Oxygen permeability measuring conditions:
Temperature: 20° C.
Outside of the bottle: 65% RH
Inside of the bottle: 100% RH

EXAMPLE 3

Copolyamide (Tg=120° C.) obtained by the same method as in Referential Example from adipic acid, isophthalic acid, terephthalic acid and MXDA (mole ratio 60/25/15/100) as starting materials, low-density polyethylene (Nisseki polyethylene M201 produced by Nippon Petrochemical Co., Ltd.), nylon 6/nylon 66 copolyamide (NOVAMID 2030 produced by Mitsubishi Chemical Co., Ltd.) and modified polyethylene (Nisseki N Polymer R1100 produced by Nippon Petrochemical Co., Ltd.) as an adhesive layer for the polyamide resin and polyethylene were extruded respectivly from four extruders and feed block to form a four-layer sheet composed of one outside layer of the low-density polyethylene, an interlayer of the copolyamide of the invention, another outside layer of the nylon 6/nylon 66 copolyamide, and adhesive layers of the modified polyethylene between the interlayer and one outside layer and between the interlayer and the other outside layer, respectively.

The multilayered sheet was stretched simultaneously in two directions at an area stretch ratio of 4 using a stretching machine (made by Toyo Seiki Seisakusho). Two such biaixially stretched films were superimposed and heat sealed using the polyethylene layer as a fusion layer to produce a bag-like product.

Table 5 shows the stretchability of the sheet, the appearance of the stretched film, the shrinkage of the bag-like product at the time of filling hot water, and the heat-sealability of the stretched film.

COMPARATIVE EXAMPLE 4

A four layer sheet composed of one outside layer of low-density polyethylene, an interlayer of nylon MXD6, another outside layer of nylon 6/nylon 66 copolyamide, and adhesive layers between the interlayer and one outside layer and between the interlayer and the other outside layer respectively was produced by using the same devices and materials as in Example 3 except that nylon MXD6 (Tg=75° C. was used instead of the copolyamide.

The resulting multilayered sheet was stretched simultaneously in two directions at an area stretch ratio of 4 using a streching machine (made by Toyo Seiki Seisakusho).

Two such biaixially stretched films were superimposed and heat-sealed by using the polyethylene layer as a fusion layer to produce a bag-like product.

Table 5 shows the stretchability of the sheet, the appearance of the stretched film, the shrinkage of the bag-like product at the time of filling hot water, and the heat-sealability of the stretched film.

TABLE 5

| Conditions and results | Example 3 | Comparative | Example 4 |
|---|---|---|---|
| Stretching temperature (°C.) | 125 | 123 | 105 |
| Appearance of the stretched film | good | thickness non-uniform | good |
| Haze of the stretched film (%) | 8 | >15 | 10 |
| Heat sealability | good | — | large shrinkage at the sealed part |
| Shrinkage of the bag-like product after hot water filling (%)(*) | 3 | — | 11 |

(*) Hot water at 95° C. was used.

EXAMPLE 4

Copolyamide (Tg=120° C.) obtained by the same method as in Referential Example from adipic acid, isophthalic acid, terephthalic acid and MXDA (mole ratio 60/25/15/100) and polycarbonate (Jupilon S2000 produced by Mitsubishi Gas Chemical Co., Inc.) were successively injected into the same mold using different injection molding machines to produce a three-layer parison composed of an inside layer of polycarbonate, an outside layer of polycarbonate, and an interlayer of the copolyamide.

The resulting parison was blow-molded under a blow pressure of 20 kg/cm$^2$ at a blow temperature of 160° to 180° C. to give a three-layer bottle having an inner capacity of 1 liter.

The three-layer bottle had excellent transparency, and as shown in Table 6, was hardly deformed even when hot water at 95° C. was filled into it. It also had a high level of oxygen barrier property.

For comparison, the results obtained with a single layer of the polycarbonate are also shown in Table 6.

TABLE 6

| Item | Example 4 | Single layer of the poly- carbonate |
|---|---|---|
| Thickness of the body portion (microns) | | thickness 335 microns |
| 1st layer | 135 | |
| 2nd layer | 22 | |
| 3rd layer | 170 | |
| Shrinkage (%) | <3 | <3 |
| Oxygen permeability (cc/day-atm) (*) | 0.16 | 10 |

*Oxygen permeability measuring conditions:
Temperature: 20° C.
Outside of the bottle: 65% RH
Inside of the bottle: 100% RH

COMPARATIVE EXAMPLE 5

A three-layer parison composed of an inside and an outside layer of polycarbonate and an interlayer of nylon MXD6 was formed by using the same devices and materials as in Example 4 except that nylon MXD6 alone was used instead of the copolyamide.

An attempt was made to blow-mold the resulting parison under a blow pressure of 20 kg/cm² at a blow temperature of 160° to 180° C. But the nylon MXD6 layer crystallized and the parison was difficult to process. A bottle obtained with great diffculty had poor transparency as a result of whitening of the nylon MXD6 layer, and the nylon MXD6 layer readily delaminated from the polycarbonatte layer. The bottle therefore lacked practical utility.

EXAMPLE 5

Copolyamide (Tg=93° C.) obtained by the same method as in Referential Example from sebacic acid, isophthalic acid, terephthalic acid and MXDA (mole ratio 65/25/15/100) and PET (Unipet RT543 produced by Japan Unipet Co., Ltd.) were successively injected into the same mold using different injection molding machines to form a three-layer parison composed of an inside and an outside layer of PET and an interlayer of the copolyamide.

The resulting parison was blow-molded under a blow pressure of 20 kg/cm² at a blow temperature of 95° to 105° C. to give a three-layer bottle having an inner capacity of 1 liter.

The three-layer bottle obtained had excellent transparency, and as shown in Table 7, was hardly deformed even when it was immersed in hot water at 75° C. in a simulated test of low-temperature sterilization. It also had good oxygen-barrier property.

COMPARATIVE EXAMPLE 6

A three-layer parison composed of an inside and an outside layer of PET and an interlayer of poly(m-xylylene sebacamide) was formed by using the same devices and materials as in Example 5 except that poly(m-xylylene sebacamide) was used instead of the copolyamide. The resulting parison was blow-molded under a blow pressure of 20 kg/cm² at a blow temperature of 85° to 95° C. to form a three-layer bottle having an inner capacity of 1 liter.

When the resulting bottle was immersed in hot water at 75° C. as in Example 7, it showed larger shrinkage than the bottle of the invention shown in Example 7, as shown in Table 7.

TABLE 7

| Item | Example 5 | Comparative Example 6 |
|---|---|---|
| Thickness of the body portion (microns) | | |
| 1st layer | 146 | 145 |
| 2nd layer | 23 | 22 |
| 3rd layer | 165 | 160 |
| Shrinkage (%) | 3 | 12 |
| Oxygen permeability (cc/day-atm) (*) | 0.18 | 0.23 |

(*) Oxygen permeability measuring conditions:
Temperature: 20° C.
Outside of the bottle: 65% RH
Inside of the bottle: 100% RH

EXAMPLE 6

Copolyamide (Tg=123° C.) was obtained from adipic acid, isophthalic acid, terephthalic acid and MXDA (mole ratio 58/27/15/100) as starting materials by the same method as in Referential Example.

Mixed pellets prepared by mixing pellets of the resulting copolyamide and nylon MXD6 pellets (Tg=75° C.) in the solid state in a weight ratio of 40:60, polypropylene (FY-6C made by Mitsubishi Petrochemical Industries, Ltd.) and modified polypropylene (Qf-305 made by Mitsui Petrochemical Industries, Ltd.) as an adhesive layer for the two resin layers were extruded by using three extruders (with a screw diameter of 45, 65 and 45 mm, respectively) and feed block by the T-die method to form a five-layer sheet composed of two outside layers of polypropylene, an interlayer of the polyamide mixture and adhesive layers of modified polypropylene between the interlayer and one outside layer and between the interlayer and the other outside layer.

The resulting sheet was then thermoformed into a container having a depth of 26 mm, a diameter at the opening portion of 64 mm and a diameter at the bottom portion of 53 mm by using a vacuum forming machine.

Water was put in the resulting container, and an aluminum foil having a heat seal layer was put over the container and welded thereto by a heat seal machine to seal up the container.

The container holding water was treated with pressurized hot water at 120° C. for 30 minutes in an autoclave for retorting (made by Tomy Seiko Co., Ltd.).

As shown in Table 8, the container obtained in this example retained good transparency and the original form even after the pressurized hot water treatment.

The resulting five-layer sheet was stretched simultaneously in two directions at an area stretch ratio of 4 using a tenter-type stretching machine (made by Toyo Seiki Seisakusho).

The biaxially stretched film was subjected to hot water treatment under pressure at 120° C. for 30 minutes. The stretchability and the haze of the product after heating and pressurized hot water treatment were measured, and the results are shown in Tables 9 and 10.

For comparison, Tables 8, 9 and 10 also give the results of Comparative Examples 1 and 2 given hereinabove.

TABLE 8

| Item | Example 6 | Comparative Example 1 | Comparative Example 2 |
|---|---|---|---|
| Haze of the body portion of the cup | | | |
| Before hot water treatment (%) | 8.2 | 19 | 8.5 |
| After hot water treatment (%) | 8.5 | 22 | 21 |
| Shrinkage (%) | 1.5 | 2.0 | 10 |

TABLE 9

| Conditions and results | Example 6 | Comparative Example 1 | | Comparative Example 2 | |
|---|---|---|---|---|---|
| Sheet thickness (microns) | | | | | |
| 1st layer | 90 | 90 | 90 | 90 | 90 |
| 2nd layer | 30 | 32 | 32 | 32 | 32 |
| 3rd layer | 35 | 36 | 36 | 36 | 37 |
| 4th layer | 34 | 33 | 33 | 33 | 32 |
| 5th layer | 98 | 97 | 97 | 97 | 97 |
| Stretch ratio | 4.0 | 4.0 | 4.0 | 4.0 | 4.0 |
| Stretching temperature (°C.) | 150 | 150 | 140 | 110 | 150 |
| Stretchability | good | nylon layer crystallized stretching impossible | great thickness nonuniformity, stretching difficult | stretching temperature low, stretching impossible | good |
| Haze of the stretched film (%) | 5.2 | — | above 20 | — | 5.4 |

TABLE 10

| Properties of the stretched film | Example 6 | Comparative Example 2 |
|---|---|---|
| After hot water treatment | | |
| Haze (%) | 5.2 | 5.5 |
| After pressurized hot water treatment | | |
| Haze (%) | 5.2 | 22 |
| Shrinkage (%) | 0.5 | 10 |

TABLE 11

| Item | Example 7 | Comparative Example 3 |
|---|---|---|
| Thickness of the body portion (microns) | | |
| 1st layer | 92 | 90 |
| 2nd layer | 15 | 15 |
| 3rd layer | 98 | 97 |
| 4th layer | 10 | 11 |
| 5th layer | 145 | 147 |
| Haze of the body portion (%) | 1.6 | 1.7 |
| Oxygen permeability (cc/day-atm) of the container (*) | 0.12 | 0.12 |
| Shrinkage after filling hot water (85° C.) (%) | 3 | 12 |

(*) Oxygen permeability measuring conditions:
Temperature 20° C.
Outside of the bottle: 65% RH
Inside of the bottle: 100% RH

EXAMPLE 7

Copolyamide (Tg=107° C.) was obtained by the same method as in Referential Example from adipic acid, isophthalic acid, terephthalic acid and MXDA (mole ratio 67/27/6/100) as starting materials.

Mixed pellets obtained by dry blending pellets of the copolyamide and nylon MXD6 pellets in a weight ratio of 55:45, and PET (RT-543 produced by Japan Unipet Co., Ltd.) were succesively injected into the same mold from different injection molding machines to form a five-layer parison composed of an inside and an outside layer of PET, an interlayer of PET and layers of the polyamide mixture between the interlayer and the outside alyer and between the interlayer and the other outside layer.

The parison was blow-molded under a blow pressure of 20 kg/cm² at a blow temperature of about 110° C. to form a 5-layer bottle having an inner capacity of 1.5 liters. The properties of the five-layer bottle are shown in Table 11.

For comparison, Table 11 also gives the results of Comparative Example 3 given hereinabove.

EXAMPLE 8

Copolyamide (Tg=120° C.) was obtained by the same method as in Referential Example from adipic acid, isophthalic acid, terephthalic acid and MXDA (mole ratio 60/25/15/100) as starting materials.

Mixed pellets obtained by dry blending pellets of the copolyamide and nylon MXD6 (Tg=75° C.) in the solid state in a weight ratio of 60:40, low-density polyethylene (Nisseki polyethylene M201 produced by Nippon Petrochemical Co., Ltd.), nylon 6/nylon 66 copolyamide (NOVAMID 2030 produced by Mitsubishi Chemical Co., Ltd.) and modified polyethylene (Nisseki N Polymer R1100 produced by Nippon Petrochemical Co., Ltd.) as an adhesive layer for the polyamide resin and polyethylene were extruded respectively from four extruders with a screw diameter of 45, 65, 45 and 40 mm, respectively) and four feed block to form a five-layer sheet composed of one outside layer of the low-density polyethylene, an interlayer of the polyamide mixture of the invention, another outside layer of the nylon 6/nylon 66 copolyamide, and adhesive layers of the modified polyethylene between the interlayer and the one outside layer and between the interlayer and the other outside layer.

The multilayered sheet was stretched simultaneously in two directions at an area stretch ratio of 4 using a stretching machine (made by Toyo Seiki Seisakusho).

Two such biaxially stretched films were superimposed and heat sealed using the polyethylene layer as a fusion layer to produce a bag-like product.

Table 12 shows the stretchability of the sheet, the appearance of the stretched film, the shrinkage of the bag-like product at the time of filling hot water, and the heat-sealability of the stretched film.

Table 12 also gives the results of Comparative Example 4 given hereinabove.

TABLE 12

| Conditions and results | Example 8 | Comparative Example 4 | |
|---|---|---|---|
| Stretching temperature (°C.) | 123 | 123 | 105 |
| Appearance of the stretched film | good | thickness non-uniform | good |
| Haze of the stretched film (%) | 8 | >15 | 10 |
| Heat sealability | good | — | large shrinkage at the sealed part |
| Shrinkage of the bag-like product after hot water filling (%) (*) | 4 | — | 11 |

(*) Hot water at 95° C. was used.

EXAMPLE 9

Copolyamide (Tg=120° C.) was obtained by the same method as in Referential Example from adipic acid, isophthalic acid, terephthalic acid and MXDA (mole ratio 60/25/15/100) as starting materials.

Mixed pellets prepared by dry blending pellets of the copolyamide and nylon MKXD6 pelelts in the solid state in a weight ratio of 50:50 and polycarbonate (Jupilon S2000 produced by Mitsubishi Gas Chemical Co., Inc.) were successively injected into the same mold using different injection molding machines to produce a three-layer parison composed of an inside layer of polycarbonate, an outside layer of polycarbonate, and an interlayer of the copolyamide.

The resulting parison was blow-molded under a blow pressure of 20 kg/cm² at a blow temperature of 160° to 180° C. to give a three-layer bottle having an inner capacity of 1 liter.

The three-layer bottle had excellent transparency, and as shown in Table 6, was hardly deformed even when hot water at 95° C. was filled into it. It also had a high level of oxygen barrier property.

For comparison, the results obtained with a single layer of the polycarbonate used in the inside and outside layers are also shown in Table 13.

TABLE 13

| Item | Example 9 | Single layer of the polycarbonate |
|---|---|---|
| Thickness of the body portion (microns) | | thickness 335 microns |
| 1st layer | 135 | |
| 2nd layer | 22 | |
| 3rd layer | 170 | |
| Shrinkage (%) | <3 | <3 |
| Oxygen permeability | 0.16 | 10 |

TABLE 13-continued

| Item | Example 9 | Single layer of the polycarbonate |
|---|---|---|
| (cc/day-atm) (*) | | |

(*) Oxygen permeability measuring conditions:
Temperature: 20° C.
Outside of the bottle: 65% RH
Inside of the bottle: 100% RH

EXAMPLE 10

Copolyamide (Tg=93° C.) was obtained by the same method as in Referential Example from sebasic acid, isophthalic acid, terephthalic acid and MXDA (mole ratio 65/25/15/100) as starting materials.

Mixed pellets prepared by dry blending pellets of the copolyamide and pllets of poly(m-xylylened sebacamide) (to be abbreviated MXD10 hereinafter) [obtained by polycondensation of sebasic acid and MXDA] in the solid state in a weight ratio of 60:40 and PET (Unipet RT543 produced by Japan Unipet Co., Ltd.) were successively injected into the same mold using different injection molding machines to form a three-layer parison composed of an inside and an outside layer of PET and an interlayer of the polyamide mixture.

The resulting parison was blow-molded under ablow pressure of 20 kg/cm² at a blow temperature of 95° to 105° C. to give a three-layer bottle having an inner capacity of 1 liter.

The three-layer bottle obtained had excellent transparency, and as shown in Table 14, was hardly deformed even when it was immersed in hot water at 75° C. in a simulated test of low-temperature sterilization. It also had good oxygen-barrier property.

For comparison, Table 14 also gave the results of Comparative Example 6.

TABLE 14

| Item | Example 10 | Comparative Example 6 |
|---|---|---|
| Thickness of the body portion (microns) | | |
| 1st layer | 140 | 145 |
| 2nd layer | 25 | 22 |
| 3rd layer | 170 | 160 |
| Shrinkage (%) | 3 | 12 |
| Oxygen permeability (cc/day-atm) (*) | 0.16 | 0.23 |

(*) Oxygen permeability measuring conditions:
Temperature 20° C.
Outside of the bottle: 65% RH
Inside of the bottle: 100% RH

What is claimed is:

1. A gas-barrier multilayered structure comprising
   (A) at least one layer of a copolyamide which is substantially amorphous and has a glass transition temperature of 90° to 130° C. and is composed of
      (a) a dicarboxylic acid component composed of from more than 55 to less than 70 mole % of an aliphatic dicarboxylic acid component and 45 to 30 mole % of an aromatic dicarboxylic acid component consisting substantially of 20 to 30 mole % of isophthalic acid and 5 to 20 mole % of terephthalic acid, and (b) a diamine component composed substantially of a m-xylylenediamine component, and
   (B) at least one layer of a thermoplastic resin other than the copolyamide.

2. The multilayered structure of claim 1 wherein an adhesive layer (C) exists between the copolyamide layer (A) and the other thermoplasic resin layer (B).

3. The multilayered structure of claim 1 wherein the aliphatic dicarboxylic acid component of the copolyamide is adipic acid.

4. The multilayered structure of claim 1 which is of a five-layer structure and is composed of a central layer of a copolyamide containing adipic acid as the aliphatic dicarboxylic acid component, two outermost layers of polyethylene or polypropylene and adhesive layers of modified polypropylene or modified polyethylene between the central layer and one outermost layer and between the central layer and the other outermost layer, respectively.

5. The multilayered structure of claim 1 which is of a five-layer structure and is composed of two outermost layers of polyethylene terephthalate, a central layer of polyethylene terephthalate, and layers of the copolyamide existing between the central layer and one outermost layer and between the central layer and the other outermost layer, respectively.

6. The multilayered structure of claim 1 which is of a four-layer structure and is composed of one outside layer of a polyolefin resin, another outside layer of a copolymer of nylon 6 and nylon 66, a central layer of the copolyamide, and an adhesive layer between the central layer and the outside polyolefin resin layer.

7. The multilayered structure of claim 1 which is of a three-layer structure and is composed of two outside layers of a polycarbonate resin and a central layer of the copolyamide interposed therebetween.

8. A gas-barrier multilayered structure comprising
(A') at least one layer of a mixture of 40 to 60% by weight of a first copolyamide which is substantially amorphous and has a glass transition temperature of 90° to 130° C. and is composed of (a) a dicarboxylic acid component composed of from more than 55 to less than 70 mole % of an aliphatic dicarboxylic acid component and 45 to 30 mole % of an aromatic dicarboxylic acid component consisting substantially of 20 to 30 mole % of isophthalic acid and 5 to 20 mole % of terephthalic acid and (b) a diamine component composed substantially of m-xylylenediamine and 60 to 40 % by weight of a second polyamide composed of a dicarboxylic acid component consisting substantially of an aliphatic dicarboxylic acid component and a diamine component consisting substantially of a m-xylylenediamine component, and
(B') at least one layer of a thermoplastic resin other than the first and second polyamides.

9. The multilayered structure of claim 8 wherein an adhesive layer (C) exists between the polyamide mixture layer (A) and the other thermoplasic resin layer (B).

10. The multilayered structure of claim 8 wherein the aliphatic dicarboxylic acid component of the first and second polyamides is adipic acid.

11. The multilayered structure of claim 8 which is of a five-layer structure and is composed of a central layer of the mixture of the first and second polyamides containing adipic acid as the aliphatic dicarboxylic acid component, two outermost layers of polyethylene or polypropylene and adhesive layers of modified polypropylene or modified polyethylene between the central layer and one outermost layer and between the central layer and the other outermost layer, respectively.

12. The multilayered structure of claim 8 which is of a five-layer structure and is composed of two outermost layers of polyethylene terephthalate, a central layer of polyethylene terephthalate, and layers of the mixture of the first and second polyamides existing between the central layer and one outermost layer and between the central layer and the other outermost layer, respectively.

13. The multilayered structure of claim 8 which is of a four-layer structure and is composed of one outside layer of a polyolefin resin, another outside layer of a copolymer of nylon 6 and nylon 66, a central layer of the mixture of the first and second polyamides, and an adhesive layer between the central layer and the outside polyolefin resin layer.

14. The multilayered structure of claim 8 which is of a three-layer structure and is composed of two outside layers of a polycarbonate resin and a central layer of the mixture of the first and second polyamides interposed therebetween.

* * * * *